June 20, 1944. T. H. McCLAIN 2,351,991
TRANSPARENT CLOSURE AND MOUNTING
Original Filed Jan. 3, 1942
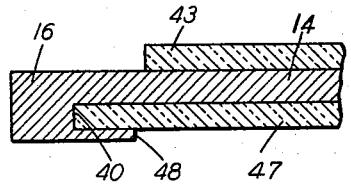
FIG-I
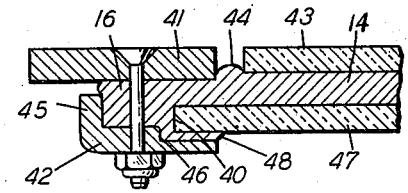
FIG-II
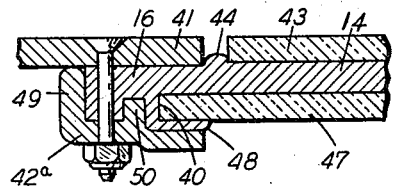
FIG-III
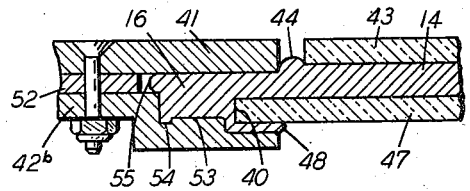
FIG-IV
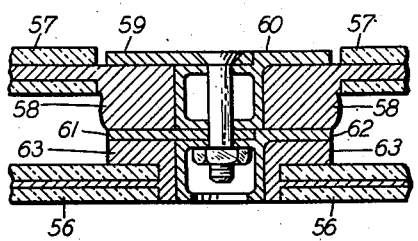
FIG-V
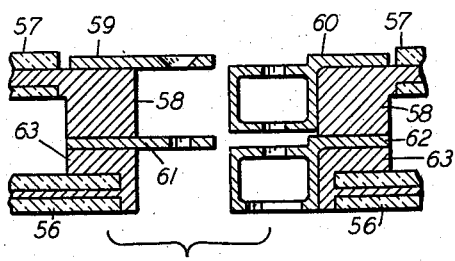
FIG-VI
INVENTOR
THOMAS H. McCLAIN
BY George C. Sullivan Patented June 20, 1944

2,351,991

UNITED STATES PATENT OFFICE 2,351,991

TRANSPARENT CLOSURE AND MOUNTING

Thomas H. McClain, Altadena, Calif., assignor to Lockheed Aircraft Corporation, Burbank, Calif.

Original application January 3, 1942, Serial No. 425,573. Divided and this application June 15, 1942, Serial No. 447,109

8 Claims. (Cl. 189—64)

This invention relates to improved transparent closure means in the form of laminated safety glass and to mounting means therefor adapting the same for use in windshield and/or window or door installations subject to severe operating conditions such as extremely high wind pressure, mechanical vibration, shocks, torsional stresses, temperature differentials, etc., said closure means being particularly useful in installations where it is desired to maintain a water- and air-tight or leak-proof seal between the laminated windshield or window material and the opening or mounting frame which receives the same. This application is a division of my copending application Serial No. 425,573, now Patent No. 2,293,656, issued August 18, 1942, entitled Transparent closure and mounting.

While substantial improvements have been made in the recent past in laminated safety glass per se, and in various glass mounting arrangements for use in airplanes, the problem of preventing rain water from gaining entrance around the edges of the windshield into the cockpit and wetting the pilot and/or instrument panel, etc., has not been satisfactorily solved. Consequently, one of the chief sources of complaint from present day pilots arises from leakage around the windshield.

Various plastics such as the acrylic resins, used to make "Plexiglas," etc., are employed to some extent in windshield constructions, but these generally are subject to a great many objections due to the ease with which they become scratched and thus lose their clearness, their high coefficient of expansion requiring special design considerations, the necessity for using tools in drilling and sawing the same to shape in their hard condition, etc.

In addition, safety glass with various interlayer materials has been tried, including an interlayer of polymerized acrylic acid esters. It is understood, however, that laminated safety glass with such interlayer has not come into successful commercial use because of certain manufacturing difficulties and also because of the inability of the interlayer to withstand a prerequisite range of temperatures so as to provide satisfactory performance under normal temperature conditions. Thus, if the interlayer were so formulated as to maintain satisfactory toughness at winter temperatures, it would be weak and soft at summer temperatures; if formulated to give satisfactory performance at high temperatures, it would be brittle in winter. However, regardless of the form of closure or interlayer employed, it has been extremely difficult, especially in airplanes, to maintain a leak-proof joint around the windshield even when rubber gaskets and other sealing materials are employed. The ever-increasing speed of airplanes generally, the exacting requirements of dive bombers, and the use of pressure cabins for high altitude flying have further contributed to making the problem of sealing the windshield and other transparent airplane closures more difficult.

One method now commonly used for installing safety glass in airplanes comprises placing a rubber or other resilient channel about the edges of the glass, which channel is thereafter forced into or clamped in a receiving channel provided therefor in the windshield or window structure or frame. In the severe service to which airplanes are subjected, a combination of causes including aging of the rubber, extreme temperature changes, vibration, torsional stresses, weaving action, wind and air pressure against the glass, etc., apparently prevents permanent sealing contact between the glass and rubber and the structures in which they are mounted. Hence, rain is often driven around the edges of the glass and sprayed into the cockpit with some force in the case of windshields and similar closures subject to the impact or relative flow of air at high speeds.

Safety glass, as heretofore commercially used, has usually included two or three plies of relatively thin plate glass bonded together by interlayers or thin sheets of transparent plastic material of substantially the same area as the glass.

A comparatively new organic plastic now used as an interlayer in safety glass is a vinyl acetal, more specifically known as polymerized vinyl butyral. This same plastic, as will appear more fully hereinafter, is employed in the transparent closure means disclosed herein, but in a new and novel manner such as to afford advantages and new results not heretofore obtainable with any known materials or closure construction.

The present invention resulted from a conception of a laminated safety glass having a plastic interlayer of such rubber-like characteristics that the interlayer could be extended beyond the marginal edges of the glass and made sufficiently thick to be utilized as a gasket or leak-proof sealing means and at the same time serve as a resilient supporting means for the glass itself so that the glass could be spaced at its edges from its mounting frame without requiring any clamping pressure to be applied to the glass. Polyvinyl butyral was found to be one material suitable for practically embodying the foregoing conception.

In practicing the present invention the polyvinyl butyral plastic provides a bond that is sufficiently soft, pliable, flexible, resilient, deformable, and "flowable" or compressible, to serve as a built-in "gasket" for sealing the laminated glass in an opening or mounting frame. This material, nevertheless, also has adequate mechanical strength to withstand high unit pressures without failure. This is important because in high altitude flying failure of the closure may result in the pilot and passengers getting the "bends."

One of the important improvements of this invention relates to providing a safety glass unit having an integral elastic sealing arrangement projecting around the edges of the glass and of sufficient thickness so that it can serve the dual purpose of supporting as well as sealing the glass. In certain installations the sealing effect of the projecting portion of the plastic may be supplemented by rubber or other sealing means, particularly if the glass area is subjected to differential pressures, as in supercharged cabin arrangements for high altitude flying.

The invention more particularly relates to a laminated closure comprising at least two sheets of glass or other hard transparent material having an intervening layer of relatively soft, resilient, tough, displaceable, highly compressible, yieldable, somewhat stretchable, water-proof, etc. plastic material therebetween, the plastic material extending beyond the marginal edges of one or all of the sheets of relatively hard material and being adapted to be secured or clamped in a frame or other mounting means to provide a leak-proof seal between the plastic material and the frame or mounting means. The intervening layer may be relatively thick or thin compared to the thickness of the relatively hard material, depending upon its intended use. In some instances the portions of the plastic material projecting beyond the marginal edges of the glass may be made thicker than the portions disposed between the hard material to provide certain advantages when clamped in a mounting frame.

The invention also relates to various expedients for mounting the present laminated closure means in an airplane or other structure.

The principal object of the invention is to provide a transparent closure or windshield or window construction for aircraft and other structures which can be so mounted in said structures as to positively prevent the entrance of rain water into said structures.

Another object of the invention is to provide a windshield construction and mounting means therefor which will remain permanently water and air-tight and which will not develop leaks under the most severe operating conditions.

Another object of the invention is to provide an improved sheet of transparent laminated material for use as windshields, etc., which includes as an integral part thereof gasket-like means adapted to yield under compressive force to form a water and air-tight seal at the marginal edges thereof.

Another object of the invention is to provide a sheet of laminated safety glass having a projecting flexible peripheral portion capable of serving as a supporting means for the glass without imposing twisting stresses thereon which would tend to break said glass.

A still further object of the invention is to provide an improved safety glass unit arranged so that it can be mounted without requiring any clamping pressure to be imposed upon the layers of glass comprising said laminated unit.

Still another object of the invention is to provide an improved laminated sheet of safety glass having an interlayer of flexible, deformable, rubber-like material projecting beyond the marginal edges of the glass and which projecting interlayer can be readily cut to shape and/or provided with apertures without requiring heating or the use of saws, drills, etc., to fit and adapt said interlayer for mounting in an opening of a given configuration.

A further object of the invention is to provide a laminated windshield or window construction that can be mounted in a frame or window opening in water and air-tight relation without necessarily requiring the use of extraneous sealing materials such as rubber gaskets, packing, etc.

Another object of the invention is to provide a laminated safety glass unit that can be mounted with a minimum of time and expense.

Another object of the invention is to provide an improved windshield or transparent closure mounting that can be effectively and permanently rendered air and water-tight, and yet which can be readily and quickly dismounted and replaced without damage to or impairment of the effectiveness of the sealing means.

Another object of the invention is to provide a strong transparent closure of the type described wherein substantial weight savings can be made by utilizing thin glass protective layers for the optical correction and surface protection of a thick intermediate layer of transparent, tough, flexible, elastic, highly compressible or flowable, etc., water-proof plastic resin material, of the type now used in relatively thin sheets in safety glass.

A further object of the invention is to provide an improved safety glass mounting wherein the outer surface of the glass can be positioned substantially flush with the surrounding surface to reduce air friction and eddy currents.

A still further object of the invention is to provide an improved safety glass having a resilient and plastic transparent interlayer of the type described that will yield under impact and so help resist penetration of the glass by objects striking the same.

Other and further objects of the invention will be apparent from the following description taken in connection with the accompanying drawing in which:

Figure I is a fragmentary sectional view of an edge portion of a modified laminated glass unit wherein the glass sheets are of different size and the projecting marginal portion of the interlayer is shown substantially thicker than the portion thereof between the sheets of glass and extending around the edge of one of said sheets;

Figure II is a fragmentary sectional view showing a mounting means for a laminated sheet such as illustrated in Figure I;

Figure III illustrates a modification of the mounting means shown in Figure II, wherein the clamping means is formed to provide a more effective grip on the plastic material;

Figure IV illustrates a further modification of the mounting means shown in Figure II;

Figure V is an enlarged fragmentary sectional view of the juncture of two double paned transparent closures or panels, such as may be used in a windshield, there being an air space between the panels; and Figure VI is a disassembled view of the panel parts shown in Figure V.

The several embodiments of the invention chosen for illustrative purposes refer to the use of safety glass sealed in various openings in an airplane body or fuselage. Normally the openings for the windshield and window will be defined by structural members of the fuselage, such as ribs and longerons, but for the purposes of this invention the closure clamping frames or mountings will be described without regard thereto.

While the term "plate glass" is used in the description, it will be understood that this is for convenience only and that other types of glass, or glass substitutes including various hard transparent resins such as acrylate plastics may be used in practicing the invention in lieu of said plate glass. It will also be understood that the term "compressible" employed to define one of the characteristics of the plastic interlayer is used herein in the sense that the plastic interlayer is readily deformable or "flowable" under clamping pressure; there being no material change in total volume. In fact upon release of the compressive force the plastic tends to return to its original shape and dimensions. Upon the application of local compressive pressure, the thickness of the plastic can be readily reduced to one-half or one-third its original thickness, but ordinarily such degree of compression is unnecessary to provide the desired seal.

It is therefore proposed to use a transparent closure unit comprising a relatively thick central lamination of a transparent, tough, flexible, elastic, rubber-like, compressible, and water-proof synthetic resin that is plastic over a wide range of normal temperatures, such as polymerized vinyl butyral resin, for example. The thick lamination of plastic material 14 is bonded between relatively thin outer layers of plate glass for improved optical qualities and abrasion resistance, the use of semi-heat treated glass adding greatly to the strength of the lamination. The plastic material projects beyond the marginal edges of the glass plates, as generally indicated at 16 in Figures I to IV, to provide means for attaching and sealing the laminated panel in a suitable frame.

If desired, the projecting plastic edge 16 may be built up to a thickness greater than that part of the plastic between the glass panes, as in Figures I, II, III and IV, in which case it is desirable to bond the plastic to the adjacent edge and/or opposite side of one or both of the glass panes. Such thickened margins are simple to produce, as a series of layers of the plastic can be bonded into an integral whole, without evidence of cleavage planes.

As shown in Figure I, the laminated unit may comprise outer and inner glass sheets 43 and 47, respectively, bonded together by a layer of polymerized vinyl butyral thickened as indicated at 16 and overlapping the inner side of the sheet 47 as indicated at 48. The plastic is preferably bonded at 40 to the edge of the glass 47 and also over the area of the extension 48.

Such an extension 48 could also be used in place of the rubber gaskets shown in my Patent No. 2,293,656.

Referring now to Figure II, a portion of the outer skin of the airplane fuselage, suitably cut out for the desired window opening, is indicated at 41, an inner frame 42 being bolted thereto at intervals to clamp the plastic margin 16 thereagainst with the outer surface of the laminated glass 43 flush with the skin. The outer pane 43 of the glass is slightly narrower than the opening in the skin to avoid contact and consequent transmission of unknown forces thereto. The clamping or compressive pressure on the plastic margin causes said plastic to flow or bulge outwardly, as at 44, between the skin 41 and glass 43. The gap at this point is preferably filled with a suitable composition to provide a smooth, flush outer surface.

The frame 42 is provided with a peripheral flange 45 that is not intended to contact the skin 41, and the plastic also bulges out between the flange and the skin as at 44a. The inner surface of the frame 42 may be stepped as at 46 to further grip the plastic which can be extended between the frame and the underlying portion of the inner surface of the glass 47, as indicated by the numeral 48.

In Figure III the inner or clamping frame 42ª has a peripheral flange 49 bearing against the skin 41 when clamped tight, the plastic being extended between the glass 47 and the frame as before. An intermediate tongue 50 on the frame 42ª serves to partially displace and grip the plastic margin 16, which bulges or flows outwardly at 44. The tongue 50 also prevents scalloping of the plastic between the bolt holes when the joint is under tension stresses. This arrangement provides a relatively rigid mount wherein internal cabin pressure can displace the laminated closure slightly outward to prevent the transmission of pressure between the inner pane and the frame, the presence of the confined plastic margin 48 preventing excessive initial pressure at this point.

In Figure IV, the frame 42ᵇ may be arranged to be clamped in metallic contact with the skin 41, or a spacer 52 may be used between said frame and skin if desired. Clamping pressure on the plastic is provided by a land 53 on the frame 42ᵇ which displaces the confined plastic into recesses 54 and 55 and effectively isolates the inner pane 47 from contact with the frame 42ᵇ.

Figures V and VI illustrate an application of my invention to a windshield or transparent cockpit enclosure structure comprising spaced inner and outer laminated panels 56 and 57 defining a dead air space therebetween. Such windshields are preferably made in sections of convenient size joined by posts or rails, and a post is shown divided and bonded to thick plastic margins joining the inner and outer panels into a unit effectively sealing the dead air space between the panels. The outer panel 57 is shown with a thick plastic interlayer in order to best resist impact, the projecting margins 58 of the plastic being bonded to the edge of the inner pane, as well as the interengaging post members 59 and 60 on its outer side while being built up on its inner side for bonding to secondary or duplicate post members 61 and 62 which in turn are bonded to a thickened plastic margin 63 integral with the thin plastic bond used in the inner panels 56. Thus, the inner panel is resiliently supported by the plastic cushion 63 against internal pressure acting thereon; and the plastic margin 58 of the outer panel is compressed slightly by bolting the post members 59 and 60 in assembled position as shown in Figure V. It will be noted that the outer panel 57 is not affected by cabin pressure, which might reach a differential pressure of 10 lbs. per square inch in a supercharged cabin plane at extreme altitude; while the inner panel 56 is relieved of shock or impact loads resulting from striking a bird in flight or gravel thrown up by the landing gear.

The synthetic resin plastic employed for both laminating or bonding the glass layers, and forming an integral protruding edge to serve as a gasket, is a vinyl acetal derivative, preferably a polymerized vinyl butyral resin. Such material is translucent before bonding between the glass layers and becomes of water-white transparency after bonding.

The plastic per se, supra, forms no part of the present invention and is commercially available under the general trade name of "Vinal," derived from vinyl butyral.

Vinyl butyral itself, it is understood, may be made by treating a mixture of vinyl acetate and vinyl alcohol with butyraldehyde, and plasticizing the resulting resin by the admixture of triethylene-glycol dihexoate. It is further understood, that an example of suitable proportions to produce the desired combination of mechanical strength, flexibility, resiliency, compressibility or flowability comprises a mixture of approximately 20% vinyl acetate and 80% vinyl alcohol treated with butyraldehyde, the resulting resin having about 30% of the total of triethylene-glycol added to plasticize the mass. The plasticized mass is then calendered or otherwise treated to reduce the same to suitable sheet form.

In one procedure for fabricating a laminated closure unit of the type described, a plurality of glass plates are assembled with interposed sheets of organic plastic material of larger dimensions. The exposed marginal extensions are masked by non-adhesive sheet material, such as Cellophone, or other inert masking material. The assembly is placed in a rubber bag from which air is evacuated. The several elements in the bag are then placed in an autoclave and therein subjected to heat of approximately 220 degrees F., under fluid pressure of approximately 150 pounds per square inch. The several elements of the laminated unit are thus bonded into a composite unit. The closure unit can also be fabricated by placing molding frames around the assembled glass sheets and plastic interlayers wherein the interlayer extensions are masked and then the assembly is subjected to sufficient heat and pressure at values indicated above to effect proper bonding. At the same time the frames provide for maintaining proper shape of the extension at a desired thickness.

It will be understood that, in accordance with the present invention, at least one sheet of plastic material or interlayer will be of larger size than the associated sheets of glass so that the edge portion of the plastic will project beyond all of the marginal edges of one of the sheets of glass as indicated generally at 16 in Figure I to provide integral means for supporting, attaching and sealing the laminated unit in a suitable frame.

When ordinary laminated or solid glass is mounted in the usual way, various forces must be exerted on the glass itself to hold and seal it in the frame. Other forces result from thermal expansion of the glass and frame, and twisting, distortion or weaving movement of the frame relative to the glass caused by stresses in the airplane fuselage. These forces are unpredictable but sometimes are large enough to break or crack the glass before any design load is applied thereto. With the present invention the pliable edge mounting does not transfer sudden movements to the glass so that the latter can be designed for known loads.

Glass is usually considered to fail in tension, and accepted values for both the modulus of rupture and the tensile strength are 6500 pounds per square inch for annealed plate glass and 20,000 pounds per square inch for semi-tempered plate glass.

As an operative example of one form of laminated construction, a 14" by 22" panel was made up with two ¼" semi-tempered plate glass sheets bonded to .180" vinyl butyral plastic projecting one inch beyond the margins of the glass, the panel being mounted solely by the plastic margin. This panel withstood a uniform pressure of 24 pounds per square inch.

Another sample formed to simulate aircraft practice, was made up of two 15" square sheets of 7/64" semi-tempered glass bent to a radius of 57" and bonded to ⅛" vinyl butyral plastic with projecting margins, which margins were mounted in a curved panel simulating an aircraft fuselage, the whole being subjected to varying hydraulic pressures. Repeated applications and fluctuations of pressure finally resulted in failure of the glass at a pressure of 11 pounds per square inch without rupture or leakage through the plastic, the plastic in effect acting like a diaphragm without rupturing.

In connection with these experiments, when the two glass sheets of the unit were of the same area, there resulted appreciable body shift of the glass panels when under pressure from one side due to the elasticity or slight stretchability of the plastic. However, this type of mounting is especially effective in resisting shock or impact loads. By way of comparison, a one foot square sample of laminated glass comprising two pieces of 7/64" plate glass bonded to a .015" vinyl butural plastic and conventionally mounted was penetrated by a two pound steel ball dropped from a height of 16 feet; whereas, two sheets of 7/64" semi-tempered glass bonded to and supported only by the protruding margins of a .120" vinyl butyral plastic was not penetrated by a fifty foot drop of a five pound steel ball.

If the above mentioned bodily shifting under differential pressure conditions is objectionable in certain installations, the arrangement shown in Figures I to IV prove advantageous. Here, the outer glass layer is cut back relative to the other layer or layers and either an outward pressure or an inward pressure is carried to some extent by the larger glass thus alleviating the pressure on the plastic and substantially restraining bodily movement of the panel while cushioning and sealing the same.

In the use of the invention the laminated transparent closure may have its edges formed in a wide variety of shapes wherein the protruding margin of the bonding or plastic material forms a tough, pliable, resilient, flexible, tenacious and rubber-like deformable gasket having sufficient mechanical strength to itself safely support the transparent closure or panel, the resilience and recoverability of the preferred type of plastic allowing the entire panel to bulge relatively to its frame under load and to return to its initial position upon release of the load. In this form of the invention the layer of plastic is much thicker and tougher than in ordinary laminated safety glass. Moreover, the clamping stresses are uniformly distributed and confined to the plastic rim 16 and thus do not detract from the ultimate strength of the glass proper.

The transparent laminations of Figures I to IV are closely related in that the outer glass layer is rebated relative to the inner glass layer and the plastic 16 extends around the edge of said inner layer for both flush mounting and to clamp the plastic layer against the inner glass layer to provide additional support for the closure.

In all forms of the invention the gasket-like integral rim can yield locally under clamping pressure to assure a waterproof and airtight seal, and to compensate for any irregularities in the clamping means, as well as to absorb the severe stresses, shocks, strains and twists to which airplane structures are subjected in use without causing breakage of the glass. The gasket-like rim is also capable of sealing openings in a supercharged cabin without requiring excessive clamping pressures to be imposed upon said rim or on the glass itself.

One of the important and advantageous characteristics of the plastic material employed in the several forms of the invention disclosed herein, as contradistinguished from the relatively hard acrylic resins, is that the present plastic can be readily trimmed with a knife or pair of hand shears to conform to the shape of the opening to receive the same, and any holes required for mounting or securing the same in place can be readily hand punched therein as desired; no saws, drills, shapers, routers, etc. being necessary.

It will be understood that the concepts and principles of the invention disclosed herein are equally useful in many fields besides aviation; for example, the transparent closure can be used for gas mask lenses, guards over grinding wheels, instrument panels, in display cases, refrigerators, pressure and vacuum chambers, port holes, automobiles, etc.

While laminated glass has been shown and described as particularly adapted to the practice of the invention, it is to be understood that glazing units broadly refer to transparent panels including material other than glass. For example, hard resins can be employed for the opposite surfaces of the unit, while marginal portions are maintained sufficiently flexible and resilient to be susceptible to edge clamping and sealing in the manner described with reference to the extensions 16. It is also possible to use the type of interlayer described in connection with transparent hard resins substituted for the sheets of glass.

It will be understood that the particular plastic disclosed herein may be replaced by other materials having the same desirable characteristics as set forth and that structural changes may be made in the mounting means shown herein without departing from the spirit of the invention or the scope of the appended claims.

I claim:

1. A laminated transparent closure comprising a plurality of panes of transparent material at least one outer pane of which is of reduced area relative to the other panes to form a rebate around the margin of the closure, and at least one intervening layer of a resilient, deformable and waterproof transparent material bonded between adjacent panes of the first mentioned material and extending beyond the marginal edges thereof, said extended portions of the intervening layer being of increased thickness relative to that part thereof bonded between the first mentioned panes and being of substantial thickness exceeding the thickness of the adjacent panes, the excess thickness being bonded to the edges of one or more of said panes and being tough, pliant and deformable to such an extent as to provide a leak-proof gasket for the transparent closure.

2. A laminated transparent closure comprising a plurality of panes of transparent material at least one pane of which is of reduced area relative to another pane to form a rebate at the margin of the closure, and at least one intervening layer of transparent plastic material bonded between adjacent panes and extended beyond the marginal edges thereof, said extended portions of the plastic layer being of increased thickness relative to that portion thereof which is bonded between said panes and overlying the margins of the remaining panes, said extended portions of plastic being tenacious, resilient, and sufficiently deformable under clamping pressure to serve as a leak-proof gasket; and mounting means for said closure comprising an outer member extending into said rebated portion and engaging one side of the extended portion of said plastic layer and a second member engaging the opposite side of the extended portion of said plastic which overlies the margins of the remaining panes, and means securing said members together to exert a clamping force upon the remaining panes underlying said extended portion of the plastic.

3. A laminated transparent closure comprising a plurality of panes of transparent material at least the outer pane of which is of reduced area relative to an inner pane to form a rebate at the outer margin of the closure, and an intervening layer of transparent plastic material bonded between said panes and extending beyond the marginal edges thereof, said extended portions of the plastic layer being of increased thickness relative to that portion thereof which is bonded between said panes, said inner pane having its margins embedded in the increased thickness of said extended portions and said extended portions of plastic being tenacious, resilient, and sufficiently deformable under clamping pressure to serve as a leak-proof gasket; and mounting means for said closure comprising a member extending into said rebated outer margin and engaging one side of the extended portion of said plastic layer, a second member engaging the opposite side of the extended portion of said plastic, said last mentioned member partially overlying the innermost pane, and spaced therefrom by the plastic margin embracing said pane and means securing said members together to exert compressive force upon said extended portion of the plastic to effect a water and air-tight seal between said closure and mounting means.

4. A windshield construction comprising a plurality of sections, each of said sections comprising a pair of laminated panels, each of said panels comprising a plurality of layers of hard transparent material with an interlayer of plastic material bonding the same together, said interlayer extending beyond the marginal edges of said transparent layers, the extended portions of said plastic interlayer being substantially thicker than said transparent layers, said panels being arranged with the extended and thickened portions of said interlayers in confronting relation so that an air space is provided between each pair of said panels, means for securing said windshield sections together including elements bonded to said extended portions of said interlayers, said elements being arranged to overlap, and means extending through the overlapped portions thereof to retain said windshield sections in assembled relation.

5. In a closure structure for an opening in a wall, an interlayer of flexible organic plastic, glass plates bonded on opposite sides of the interlayer and defining therewith a laminated unit, marginal portions of the interlayer extending beyond the edges of the glass plates and constituting a flexible sealing border, clamping frame members pressing in sealing relation upon opposite sides of the extended marginal border of the interlayer, the marginal sealing border of the interlayer being thicker than the body of the interlayer that lies between the glass plates and having a shoulder abutting against the edge of one of the glass plates, and means for clamping the frame members in their sealing relation upon the marginal border.

6. In a fluid tight airplane passenger compartment adapted to withstand differential fluid pressures experienced in airplanes in stratospheric flights, said compartment having an opening, an interlayer of flexible organic plastic, tempered glass plates bonded upon opposite sides of the interlayer and defining therewith a laminated glazing unit, marginal portions of the interlayer extending beyond the edges of the glass plates and constituting a flexible sealing border, clamping frame members around the opening in the compartment and pressing in sealing relation upon opposite sides of the extended border of the interlayer to define a portion of fluid-tight structure, the marginal sealing border being thicker than the body of the interlayer that lies between the glass plates and having a shoulder secured against the edge of one of the plates, and means for clamping the frame members in their sealing relation upon the marginal border.

7. A laminated transparent closure comprising a plurality of surface panes of hard transparent material one of which is smaller than the remainder thereby forming a rebate around the margin of said closure and having at least one interlayer of a resilient, deformable and waterproof transparent material bonded to and between the surface panes and extending beyond the marginal edges thereof, said extending marginal portion being thicker than the portion of said interlayer disposed between said surface panes, at least a portion of said extending margin of the interlayer material being extended back over the margin of the closure on the side thereof remote from said rebate.

8. A laminated transparent closure comprising a plurality of surface panes of hard transparent material one of which is smaller than the remainder thereby forming a rebate around the margin of said closure and having at least one interlayer of a resilient, deformable and waterproof transparent material bonded to and between the surface panes and extending beyond the marginal edges thereof, said extending marginal portion being thicker than the portion of said interlayer disposed between said surface panes, at least a portion of said extending margin of the interlayer material being extended back over the margin of the closure on the side thereof remote from said rebate, and mounting means for said closure, comprising spaced jaws engaging the margins of said closure and the extended portion of the interlayer, whereby the portion of the interlayer extended back over the margin of the surface pane serves to resiliently separate the jaw from said pane.

THOMAS H. McCLAIN.